United States Patent [19]

Robinson

[11] Patent Number: 5,043,885
[45] Date of Patent: Aug. 27, 1991

[54] DATA CACHE USING DYNAMIC FREQUENCY BASED REPLACEMENT AND BOUNDARY CRITERIA

[75] Inventor: John T. Robinson, Yorktown Heights, N.Y.

[73] Assignee: International Business Machines Corporation, Armonk, N.Y.

[21] Appl. No.: 391,220

[22] Filed: Aug. 8, 1989

[51] Int. Cl.⁵ .............................................. G06F 12/12
[52] U.S. Cl. ................... 364/200; 364/243.4; 364/243.41
[58] Field of Search ... 364/200 MS File, 900 MS File, 364/; 365/49

[56] References Cited

U.S. PATENT DOCUMENTS

| | | | |
|---|---|---|---|
| 3,964,028 | 6/1976 | Belady et al. | 364/200 |
| 4,168,541 | 9/1979 | Dekarske | 365/230 |
| 4,322,795 | 3/1982 | Lange et al. | 364/200 |
| 4,458,310 | 7/1984 | Shi-JehChang | 364/200 |
| 4,463,420 | 7/1984 | Fletcher | 364/200 |
| 4,530,054 | 7/1985 | Hamstra et al. | 364/200 |
| 4,833,642 | 5/1989 | Ooi | 365/49 |
| 4,835,686 | 5/1989 | Furuya et al. | 364/200 |
| 4,920,478 | 4/1990 | Furuya et al. | 364/200 |

Primary Examiner—Michael R. Fleming
Assistant Examiner—Gopal C. Ray
Attorney, Agent, or Firm—Ronald L. Drumheller

[57] ABSTRACT

A cache directory keeps track of which blocks are in the cache, the number of times each block in the cache has been referenced after aging at least a predetermined amount (reference count), and the age of each block since the last reference to that block, for use in determining which of the cache blocks is replaced when there is a cache miss. At least one preselected age boundary threshold is utilized to determine when to adjust the reference count for a given block on a cache hit and to select a cache block for replacement as a function of reference count value and block age.

12 Claims, 3 Drawing Sheets

DATA CACHE USING DYNAMIC FREQUENCY BASED REPLACEMENT AND BOUNDARY CRITERIA

BACKGROUND OF THE INVENTION

1. Field of the Invention

The present invention relates generally to the operation of a cache memory in a data processing system. More particularly, the invention relates to methods and apparatus for making cache block replacement decisions based on a combination of least recently used (LRU) stack distance and data reference frequencies.

2. Description of the Prior Art

In many data processing systems, there is provided between the working store of the central processing unit and the main store, a high speed memory unit which is commonly called a "cache". This unit enables a relatively fast access to a subset of data and instructions which were previously transferred from main storage to the cache, and thus improves the speed of operation of the data processing system. The transfer of operands or instructions between main store and cache is usually effected in fixed-length units which are called "blocks" (sometimes "lines") of information. The selection of blocks for transfer to the cache, and also their location in cache (except for a possible pre-assignment of classes to cache sub-areas) depend on the respective program, the operands used, and the events that happen during program execution.

Cache memory may also be used to store recently accessed blocks from secondary storage media such as disks. This cache memory could be part of main storage or a separate memory between secondary and main storage.

To enable retrieval of information from the cache, (wherever located), a table of tags of block addresses is maintained in a "directory" which is an image of the cache. Each block residing in cache has its tag or address stored in the respective position in the directory. Once the cache is filled-up, new information can only be entered if an old block is deleted or overwritten. Certain procedures are necessary to select blocks as candidates for replacement, and to update the directory after a change of the cache contents.

A number of systems are known in the art which use cache or high speed buffer stores and provide a mechanism for replacement selection and directory updating.

U.S. Pat. No. 4,322,795 to R. E. Lange et al, discloses a cache memory arrangement using a least-recently-used ("LRU") scheme for selecting a cache location in which to store data fetched from main memory upon a cache miss.

U.S. Pat. No. 4,168,541 to C. W. DeKarske, discloses a replacement system for a set associative cache buffer, i.e., a cache which is subdivided into sets each associated with a class of data having some address bits in common. The system uses age bits to determine the least recently used block in a set. The age bits are updated each time a block is referenced. A directory (tag buffer) is provided for storing tags representing a portion of the address bits of data words currently in the cache memory. The patent describes details of updating the directory and the age bits.

Belady et al, in U.S. Pat. No. 3,964,028, discloses a cache utilizing an LRU/stack replacement scheme and teaches the concept of utilizing stack distances as part of the replacement criteria.

Hamstra et al, in U.S. Pat. No. 4,530,054, discloses utilizing linked lists of time stamped access information to manage a cache memory.

Chang, in U.S. Pat. No. 4,458,310, discloses partitioning a cache memory system into a plurality of cache memories, each for storing cache memory words having a similar time usage history. This structure allows lowest priority replacement circuitry to be used when main memory words are transferred to cache.

Two printed publications also illuminate the state of the prior art. The first, entitled "High Performance Computer Architecture", by Harold S. Stone, teaches using a fixed partition directory and reference bits to make replacment choices. The second, entitled "Principles of Database Buffer Management", by Wolfgang Effelsberg and Theo Haerder, teaches using reference counts to make replacement choices.

In general, none of the prior art references discloses making replacement decisions based on a combination of LRU stack distance and data reference frequencies. More particularly, none of the prior art references teach the use of boundaries to determine when reference counts should be incremented and which blocks are eligible for replacement; none teach the use of integer counts to determine when non-LRU choices should be made, nor do any of the references teach the use of a single main directory with arbitrary position boundaries.

It would be desirable to be able to make replacement decisions based on the aforesaid combination of LRU stack distance and data reference frequencies, utilizing reference counts, arbitrary boundaries, etc., to improve cache management performance.

SUMMARY OF THE INVENTION

It is an object of the invention to devise methods and apparatus to support making cache block replacement decisions based on a combination of least recently used ("LRU") stack distance and data reference frequencies.

It is a further object of the invention to devise methods and apparatus for managing a data cache in which the replacement technique is based upon dynamically maintained frequency statistics, where the frequencies are computed in such a fashion as to factor out the stack distance component of the reference probability distributions.

It is still a further object of the invention to utilize reference counts, and at least one preselected age boundary threshold condition, to determine when to adjust a reference count.

Further yet, it is an object of the invention to perform the cache management/block replacement function utilizing a single cache directory and cache block replacement techniques that depend on reference count value and the age of a given block.

According to the invention, methods and apparatus are disclosed, for use with a cache memory resource (that includes a plurality of cache blocks for storing data) and a cache directory (for keeping track of which of said blocks are in use and the number of times each block is referenced, and block age), for determining which of said plurality of cache blocks is to be replaced with data to be stored in cache memory on a cache miss. The methods and apparatus cause a reference count, for each cache block, to be maintained in the cache directory; utilize at least one preselected age boundary threshold to determine when to adjust a reference count for a given block on a cache hit; and select a cache block for replacement as a function of reference count value and block age.

More particularly, according to one embodiment of the invention, a reference count, associated with a given block, is initialzed whenever the given block is used to store data from outside the cache on a cache miss. Block reference counts are then stacked, with the block count associated with the most recently used block being placed at the top of the stack, and an aging factor is maintained in the cache directory, for each block, for use in determining if a block has aged beyond a preselected age boundary threshold. The reference count associated with a given block is adjusted whenever a cache hit occurs on the given block if the block has aged beyond the preselected age boundary threshold.

On a cache miss, the block to be replaced can be selected from the set of blocks whose reference counts are below a preslected reference count threshold value thereby allowing for the possibility of non least recently used block replacement choices.

Furthermore, according to another embodiment of the invention, a chain of blocks, whose reference counts are below a preslected reference count threshold value, can be maintained to facilitate rapid identification of possible block replacement choices.

By utilizing the disclosed methods and apparatus cache management performance can be significantly improved.

BRIEF DESCRIPTION OF THE DRAWINGS

The aforestated and other objects and features of the invention can be best understood by those skilled in the art by reading the following detailed description in conjunction with the drawing in which.

DESCRIPTION OF THE PREFERRED EMBODIMENTS

As indicated hereinbefore, the invention provides techniques for managing a data cache in which block (or line) replacement techniques are based upon dynamically maintained frequency statistics, where frequencies are computed in such a fashion which factors out the stack distance component of the reference probability distribution.

Over the years much work has been performed on virtual and cache memory management. Most of the work up to 1973 is summarized in chapters 6 and 7 of "Operating Systems Theory" by Coffman and Denning. More recent work on what is here called data caches, i.e. caches for file systems or database systems, is described by Effelsberg and Haerder in an article entitled "Principles of Database Buffer Management" ACM TODS 9,4 (Dec. 1984). Both of these publications are hereby incorporated by reference.

It is well known, by those skilled in the art, that under an independent reference model the optimal block replacement method is to replace the block with the lowest reference probability. Disregarding the problem of determining reference probabilities, this method, and other methods based on an independent reference premise, have never worked out well in practice since for data caches there is a strong degree of locality, i.e., the reference probability distribution typically seems to have a strong stack distance component. In summary, until now, it seems that no replacement method has been able to consistently outperform LRU or CLOCK based replacement methods in real systems (CLOCK-like methods approximate LRU using reference bits).

The basic idea of the invention is to maintain frequency statistics for recently referenced blocks in which the assumed stack distance component of the reference probability distribution has been "factored out", and to use these statistics in order to make better replacement choices than LRU would make. This is illustrated in FIG. 1.

Figure 1:
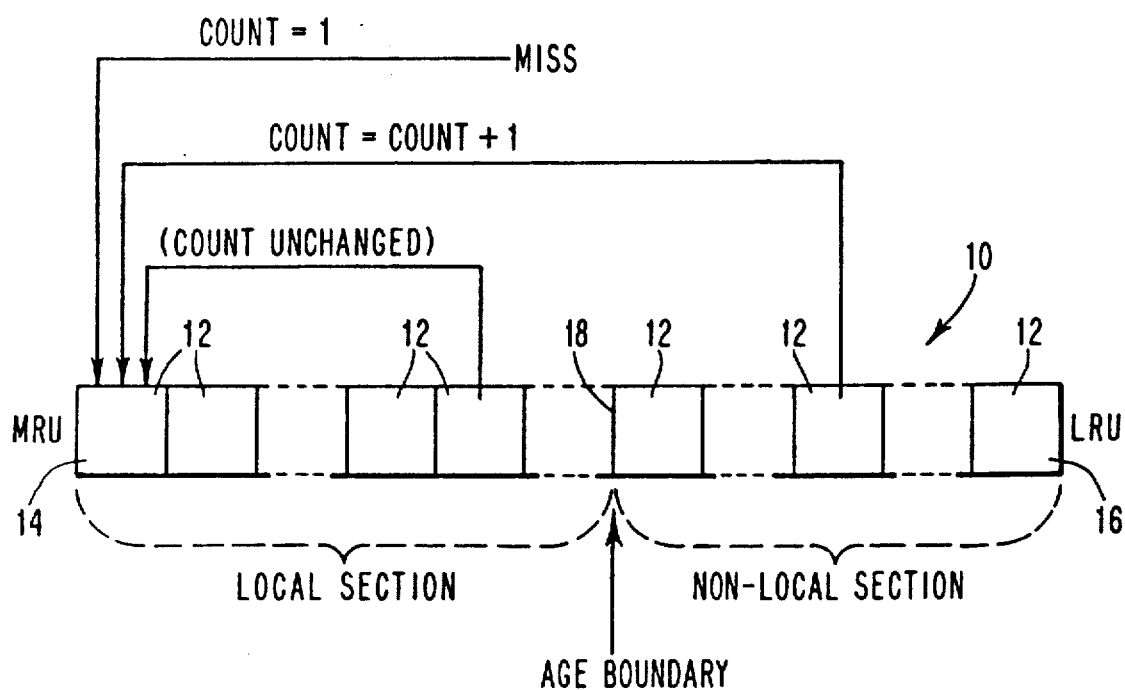
FIG. 1 illustrates how a combination of block aging, boundary condition and reference count techniques may be used in accordance with the teachings of the invention.

According to the invention, as depicted in FIG. 1, associated with each cache directory entry 12 in the cache directory 10 is a reference count which according to one embodiment of the invention is initialized to 1 when a miss occurs and a new block is brought from outside the cache into the cache and the associated cache directory entry is placed into the most recently used ("MRU") position 14. Another embodiment of the invention will be set forth hereinafter with reference to FIG. 2.

Again with reference to FIG. 1, the cache directory essentially works in LRU fashion, with a cache directory entry being put in the MRU position each time a block is referenced. According to the invention, however, the block associated with the cache directory entry in the LRU position 16 will not necessarily be the one that it replaced when there is a miss. Additionally, according to the invention, there is a preselected boundary (age boundary) 18. Each time a block ages past this boundary, this fact is updated for that block in the cache directory, so that for each block in the cache it is known which side of the age boundary it is on.

FIG. 1 depicts the section of the cache directory on the MRU side of the boundary as the "local" section. Counts are updated, as shown in FIG. 1. According to the FIG. 1 illustrative embodiment of the invention, when there is a hit on the local section, the count remains the same; when there is a hit on the non-local section, the count is incremented.

Various versions of the invention result from the way the reference counts are used to select blocks to replace. One simple version is as follows: when there is a miss, select the least recently used block in the non-local section whose count is below a preselected threshold. If there is no such block below the preselected count threshold, then select the least recently used block. Blocks whose counts are below the threshold can be tracked with in a separate LRU chain, leading to an efficient implementation. Yet another version is described hereinafter with reference to FIG. 2.

Figure 2:
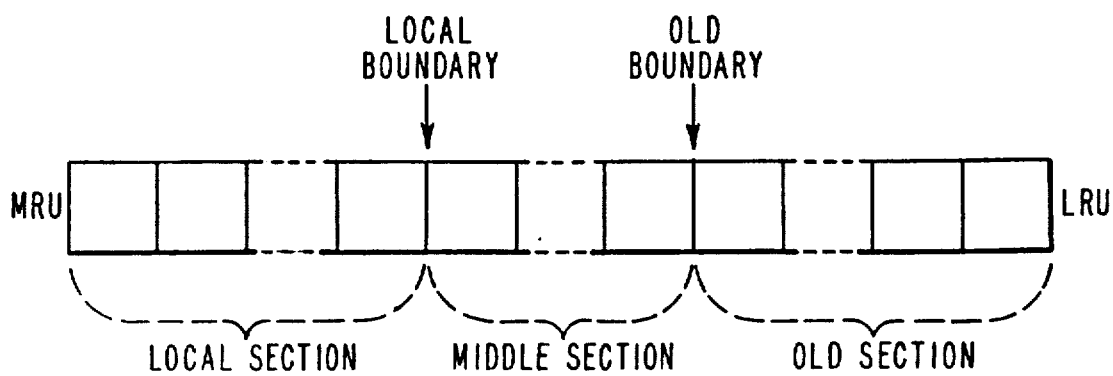
FIG. 2 illustrates another embodiment of the invention in which multiple boundary conditions are used to make replacement choices in accordance with the teachings of the invention.

In the alternate illustrative embodiment, the cache directory is divided into three sections using two boundaries, as shown in FIG. 2. A local section, used for determining whether reference counts are incremented on hits as described above, is shown together with a middle section and an old section. Blocks with reference counts in the old section are the blocks from which replacement selections are made.

On a miss, a block is selected to be replaced by finding the block (or blocks) with the smallest count in the old section and then replacing that block (or least recently used such block if there is more than one) if the count is below a predetermined threshold. Otherwise, the least recently used block is replaced.

According to the preferred embodiment of the invention, an efficient implementation is possible by maintaining a separate LRU chain for blocks with a count of 1, another separate LRU chain for blocks with a count of 2, and so forth up to the preselected threshold count. Finding a block to replace then consists of scanning the blocks (from LRU to MRU) in each such LRU chain (in ascending count order) until a block is found in the old section. Other techniques that could be used involve maintaining a data structure identifying blocks in the old section with counts below the threshold that supports a "find min" operation, i.e. find the block with the minimum count. Examples of such data structures are heaps, sorted lists, sorted arrays, and so on.

A more detailed description of the preferred embodiment will now be set forth. Each block in the cache has a corresponding cache directory entry in the cache directory and is found by means of the cache directory. The cache directory consists of an array of cache directory entries, individual pointers and pointer tables used for locating blocks, updating the directory, and making replacement decisions. The location in the cache of a block found in the cache directory is known from the offset (i.e., the position) of the corresponding cache directory entry in the array of cache directory entries.

The preferred embodiment makes use of several known data structures and techniques, including a hash table for locating blocks in the cache, and doubly-linked lists for (1) the overall LRU chain, (2) individual LRU chains for each count value below a threshold, and (3) the chains of cache directory entries having identical hash values. There are many alternatives in the choice of such data structures and techniques. For example there are several known types of hashing structures which could be used in place of the one described, and there are various types of tree-structured indices which could be used instead of hashing for locating cache directory entries.

Figure 3:
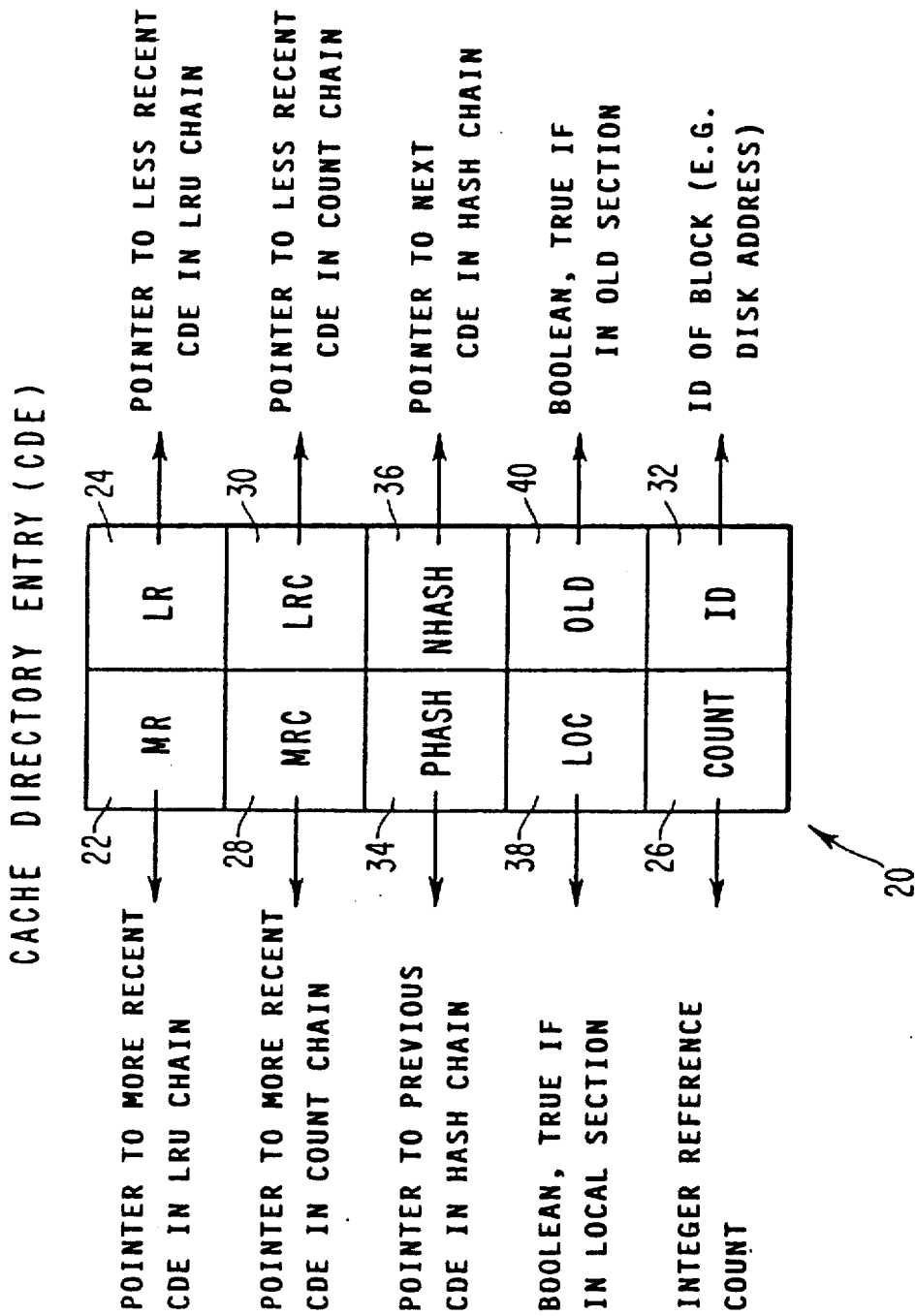
FIG. 3 illustrates the format of a cache directory entry in accordance with the preferred embodiment of the invention.

The format of a cache directory entry (CDE) 20, in accordance with the preferred embodiment, is illustrated in FIG. 3. Fields 22, 24 contain the pointers MR and LR which establish the doubly-linked list referred to herein as the overall LRU chain. COUNT field 26 contains an integer reference number which is used to make replacement decisions. Fields 28, 30 contain the pointers MRC and LRC which establish the doubly-linked list for the number in COUNT field 26. Since different CDEs in general may have a different reference count in the COUNT field 26, a separate doubly-linked list is established by fields 28, 30 for each reference count which exists in the cache directory. ID field 32 of a CDE identifies the origin of the block in cache memory which corresponds with this CDE (the ID field could be a disk address, a combination of a file name and the number of the block within the file, etc.). Since the preferred embodiment makes use of a hash function to locate CDEs, more than one origin may correspond with the same hash value. Fields 34, 36 contain the pointers PHASH and NHASH which establish the doubly-linked list for the hash value which corresponds with the ID in field 32. Field 38 contains a boolean value LOC which indicates whether the block corresponding with this CDE is in the local section and field 40 contains a boolean value OLD which indicates whether such block is in the old section (where these sections are as previously shown in FIG. 2).

Figure 4:
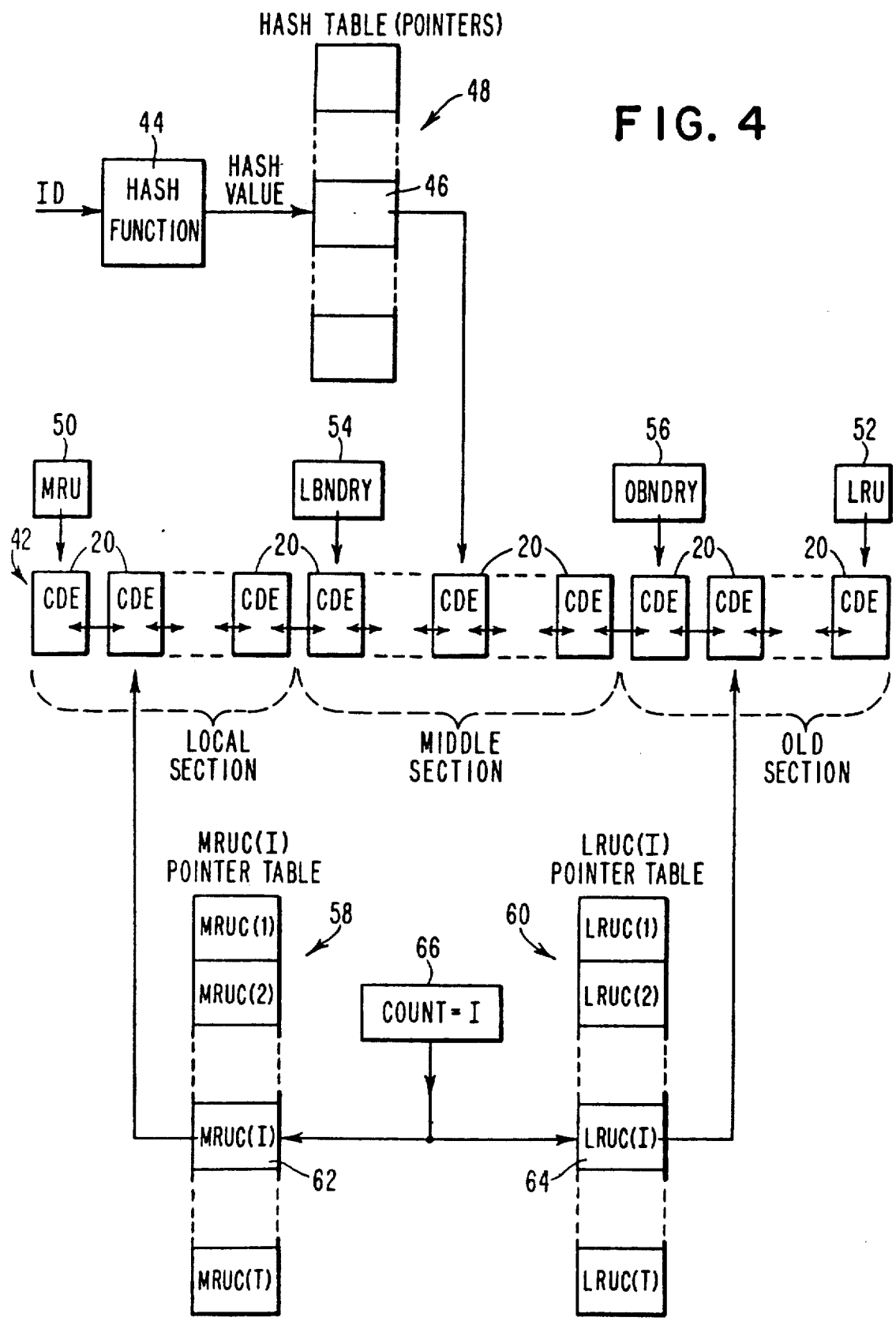
FIG. 4 illustrates the various data structures used in locating, manipulating and updating cache directory entries in accordance with the preferred embodiment.

The various data structures used in locating and manipulating CDEs are as shown in FIG. 4. The doubly-linked list 42 of CDEs is the overall LRU chain and corresponds to the list shown earlier in FIG. 2. The pointers for accessing the other two kinds of chains are also illustrated, as will be described, but these chains are not explicitly shown. A CDE for a block is found by first hashing the block ID using a hash function 44 to produce a hash value or offset, which corresponds with a particular element 46 in hash table 48. The hash table is an array of pointers to CDEs. The hash table element 46 points either to the head or the tail of a doubly-linked list of CDE having the same hash value. Starting with the CDE referred to in the hash table, the list of CDEs having the same hash value is searched sequentially (using either the pointer PHASH or NHASH in the CDEs depending upon whether the hash table pointed to the head or the tail) comparing the ID field in each such entry with the ID of the block being searched for. If an identical ID is found, the block is in the cache, and this case is referred to as a HIT. Otherwise either the hash table pointer was null or the ID was not found in the list. In such case the block is not in the cache and must be brought into the cache, which in general means that an existing block must be replaced with this new block. This case is referred to as a MISS.

Also shown in FIG. 4 are the following: pointers MRU 50 and LRU 52 to the head and tail of the overall LRU chain; pointers LBNDRY 54 and OBNDRY 56 to CDEs at the beginning of the middle section and the beginning of the old section; and two arrays of pointers MRUC(I) 58 and LRUC(I) 60, each of size T (where T is the constant preselected threshold described above), and in which the pointers at offset I in these arrays, pointers 62, 64, are to the head and tail of the LRU chain for the CDEs with a COUNT field value of I.

The method of operation will now be described by considering separately the cases of a hit or a miss. In the following detailed description, the term "block" may be used sometimes to refer to the CDE corresponding to a block without ambiguity since each CDE is uniquely identified with a particular block in the cache. The case of a hit will be considered first. In this case a CDE for the block has been found as previously described and no replacement decision is necessary, it is only necessary to update the COUNT field and various other fields, chains, and pointers. This takes place as follows, where the CDE and the CDE fields referred to below are for the block that was found in the cache, unless otherwise specified.

1. If MR is null then exit (the block is the most recently accessed block).

2. If OLD is true then the block is currently in the old section, but since it will be moved out of this section, the OBNDRY pointer must be adjusted: set OBNDRY to point to the CDE of the next more recent block (which is the CDE pointed to in the MR field of the CDE currently pointed to by OBNDRY) and set the OLD field in this CDE to true (OBNDRY points to the first block in the old section).

3. If LOC is false then the block is not in the local section, but since it will be moved there, LBNDRY must be adjusted: set LBNDRY to point to the CDE of the next more recent block (which is the CDE pointed to in the MR field of the CDE currently pointed to by LBNDRY) and set the LOC field in this CDE to false (LBNDRY points to the first block in the middle section).

4. Remove the CDE from the overall LRU chain (by copying the LR field of this CDE to the LR field of the CDE pointed to by the MR field of this CDE and by copying the MR field of this CDE to the MR field of the CDE pointed to by the MR field of this CDE) and insert it at the head of the overall LRU chain by making MRU point to it. Also, the MR field of the CDE previously pointed to by MRU must be made to point to this CDE and the LR field of this CDE must be made to point to the CDE previously pointed to by MRU.

5. If LOC is false, then go to the next step. Otherwise LOC is true and the block was already in the local section, which means that COUNT will not be incremented. It is necessary to update the LRU chain for this value of COUNT, however, if COUNT is less than or equal to T. To do so, remove the CDE from the LRU chain for CL with this value of COUNT (by making the LRC field of the CDE pointed to by the MRC field of this CDE point to the CDE pointed to by the LRC field of this CDE, and by making the MRC field of the CDE pointed to by the LRC field of this CDE point to the CDE pointed to by the MRC field of this CDE), and insert it at the head of this chain by making MRUC(COUNT) point to this CDE (and by making the MRC field null and the the LRC field point to the CDE previously pointed to by MRUC(COUNT)). Then exit.

6. Set LOC to true and set OLD to false.

7. If COUNT is less than or equal to T then remove the CDE from the LRU chain for CDEs with this value of COUNT (by making the LRC field of the CDE pointed to by the MRC field of this CDE point to the CDE pointed to by the LRC field of this CDE, and by making the MRC field of the CDE pointed to by the LRC field of this CDE point to the CDE pointed to by the MRC field of this CDE).

8. If COUNT is less than the maximum integer that can be represented in this field, then increment COUNT.

9. If COUNT is less than or equal to T then insert the CDE at the head of the LRU chain for blocks with this value of COUNT by making MRUC(COUNT) point to this CDE (and by making the MRC field null and the the LRC field point to the CDE previously pointed to by MRUC(COUNT)).

This concludes the description for the case of a hit. In the case of a miss, it is first necessary to find a CDE for a block to replace. This takes place as follows.

1. Set I to 1 so element 66 initially points to MRUC(1) and LRUC(1).

2. If LRUC(I) is not null and the OLD field of the CDE pointed to by LRUC(I) is true, then go to step 5.

3. Increment I.

4. If I is less than or equal to T then go again to step 2.

5. If I is less than or equal to T then the CDE for the block to replace is that one pointed to by LRUC(I). Otherwise a block in the old section with a count less than or equal to T was not found, and by default the least recently used block will be replaced, which is the CDE pointed to by LRU.

Having thus found a CDE for a block to replace, the various fields, pointers, and chains are updated as follows, where unless otherwise specified the CDE and the CDE fields are for the block that was found to replace.

1. The CDE will be moved out of the old section into the local section, therefore the OBNDRY and LBNDRY pointers must be adjusted: (a) set OBNDRY to point to the CDE of the next more recent block (which is the CDE pointed to in the MR field of the CDE currently pointed to by OBNDRY) and set the OLD field in this CDE to true (OBNDRY points to the first block in the old section); (b) set LBNDRY to point to the CDE of the next more recent block (which is the CDE pointed to in the MR field of the CDE currently pointed to by LBNDRY) and set the LOC field in this CDE to false (LBNDRY points to the first block in the middle section).

2. Remove the CDE from the overall LRU chain (by copying the LR field of this CDE to the LR field of the CDE pointed to by the MR field of this CDE and by copying the MR field of this CDE to the MR field of the CDE pointed to by the MR field of this CDE).

3. If COUNT is less than or equal to T, remove the CDE from the LRU chain for CDEs with this value of COUNT (by making the LRC field of the CDE pointed to by the MRC field of this CDE point to the CDE pointed to by the LRC field of this CDE, and by making the MRC field of the CDE pointed to by the LRC field of this CDE point to the CDE pointed to by the MRC field of this CDE).

4. Set COUNT to 1, LOC to true, and OLD to false.

5. Insert the CDE at the head of the overall LRU chain by making MRU point to it. Also, the MR field of the CDE previously pointed to by MRU must be made to point to this CDE and the LR field of this CDE must be made to point to the CDE previously pointed to by MRU. Also insert the CDE at the head of the LRU chain for CDEs with a COUNT of 1 by making MRUC(1) point to this CDE (and by making the MRC field null and the the LRC field point to the CDE previously pointed to by MRUC(1)).

6. Remove the CDE from the chain of CDEs with the same hash value using the PHASH and NHASH fields, and if necessary update the hash table entry for this chain appropriately.

7. Set ID to refer to the new block that is replacing the old one.

8. Insert the CDE at the head of the chain of CDEs with hash value hash(ID) pointed to by the hash table at offset hash(ID), and update the hash table to point to the CDE at this offset.

This concludes the description of the required steps in the case of a miss.

The invention, taught by way of the illustrative embodiments set forth hereinabove, can be generalized to maintain frequency statistics for a larger number of blocks than those in the cache by using an extended directory. In this case the count would not be initialized to one for a miss if information about the block were in this extended directory; instead the count just would be incremented by one as described above. A further generalization might be to maintain frequency statistics (in which the stack distance component has been factored out as described above) for all blocks, and to use these statistics for replacement. This latter method could conceivably be made efficient using a variety of techniques that are outside the scope of this invention. However, in general, maintaining frequency information for all blocks represents considerably more work than maintaining such information for only some much smaller number of the most recently referenced blocks.

In accordance with the preferred embodiment, in order to avoid an indefinite increase of counts, a reference count maximum is specified. Also, in order to adapt to changes in the underlying frequency distribution, all counts periodically may be decremented or multiplied by a reduction factor.

Another generalization is to estimate the probability of reference by using a function that combines the count and the age of the block in the cache, and then to use this estimated probability in order to select a block to replace. This age could be computed using a variety of methods, e.g. real time, number of references since the block was brought in the cache, number of blocks that have aged to the local boundary since the block was brought in the cache, etc. For example, if the block is of age T and its "true" probability of reference (with stack distance "factored out") is P, its count should be proportional to PT, and so the probability of reference might be estimated as the count divided by T.

Finally, those skilled in the art will recognize that it is relatively straight forward to approximate the methods described above using CLOCK-like techniques in ways that are to the approximation of LRU using reference bits.

What has been described are methods and apparatus that meet all of the objectives set forth hereinbefore. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variaitons are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A method, for use with a cache memory resource, that includes a plurality of cache blocks for storing data, and a cache directory, for keeping track of which of said blocks are in use, the number of times each block is referenced and block age, for determining which of said plurality of cache blocks is to be replaced with data to be stored in said memory on a cache miss, comprising, when implemented by a computer, the steps of:
 (a) maintaining a reference count, for each cache block, in said cache directory;
 (b) utilizing at least one preselected age boundary threshold to determine when to adjust a reference count for a given block on a cache hit; and
 (c) selecting a cache block for replacement as a function of reference count value and block age.

2. A method, for use with a cache memory resource, that includes a plurality of cache blocks for storing data, and a cache directory, for keeping track of which of said blocks are in use, the number of times each block is referenced and block age, for determining which of said plurality of cache blocks is to be replaced with data to be stored in said memory on a cache miss, comprising, when implemented by a computer, the steps of:
 (a) maintaining a reference count, for each cache block, in said cache directory;
 initializing the reference count associated with a given block whenever the given block is used to store data from outside the cache on a cache miss;
 (c) stacking block reference counts, with the block count associated with the most recently used block being placed at the top of the stack;
 (d) maintaining an aging factor in said cache directory, for each block, for use in determining if a block has aged beyond a preselected age boundary threshold; and
 (e) adjusting the reference count assoicated with a given block whenever a cache hit occurs on the given block and the block has aged beyond said preselected age boundary threshold.

3. A method as set forth in claim 2 further comprising, when implemented by a computer, the step of selecting, on a cache miss, the block to be replaced from the set of blocks whose reference counts are below a preselected reference count threshold value thereby allowing for the possibility of non least recently used block replacement choices.

4. A method as set forth in claim 2 further comprising, when implemented by a computer, the step of maintaining a chain of blocks whose reference counts are below said preselected reference count threshold value to facilitate rapid identification of possible block replacement choices.

5. A method as set forth in claim 2 further comprising, when implemented by a computer, the step of periodically reducing said reference count by a reduction factor in order to adapt the count to changes in the underlying frequency distribution.

6. A method as set forth in claim 2 further comprising, when implemented by a computer, the step of limiting said reference count to a predefined maximum count to avoid indefinite reference count increases.

7. A method, for use with a cache memory resource, that includes a plurality of cache blocks for storing data, and a cache directory, for keeping track of which of said blocks are in use, the number of times each block is referenced and block age, for determining which of said plurality of cache blocks is to be replaced with data to be stored in said memory on a cache miss, comprising, when implemented by a computer, the steps of:
 (a) maintaining a reference count, for each cache block, in said cache directory;
 (b) initializing the reference count associated with a given block whenever the given block is used to store data from outside the cache on a cache miss;
 (c) stacking block reference counts, with the block count associated with the most recently used block being placed at the top of the stack;
 (d) maintaining an aging factor in said cache directory, for each block, for use in determining if a block has aged beyond first and second preselected age boundary thresholds;
 (e) adjusting the reference count associated with a given block whenever a cache hit occurs on the given block and the block has aged beyond said first preselected age boundary threshold, as indicated by the value of a block's aging factor; and (f) selecting, on a cache miss, the block to be replaced from the set of blocks aged beyond said second preselected age boundary threshold, as indicated by the value of a block's aging factor, whose reference counts are below a preselected reference count threshold value, thereby facilitating non least recently used block replacement choices.

8. A method as set forth in claim 7 further comprising, when implemented by a computer, the steps of:
(a) maintaining multiple separate chains of blocks (a) maintaining multiple whose reference counts are below said preselected reference count threshold value and are of equal value in each chain; and
(b) scanning each of said chains of blocks to identify and replace a block that has aged beyond said second preselected age boundary threshold.

9. Apparatus for use with a cache memory resource, that includes a plurality of cache blocks for storing data, and a cache directory for keeping track of which of said blocks are in use, the number of times each block is referenced, block age, and at least one preselected age boundary threshold value, for determining which of said plurality of cache blocks is to be replaced with data to be stored in said memory on a cache miss, comprising:
(a) first means, coupled to said cache directory, for selectively adjusting the reference count maintained in said directory for each cache block;
(b) second means, coupled to said first means, for selectively enabling reference count adjustment, on a cache hit, as a function of cache block age and the value of at least one preselected age boundary threshold value: and
(c) third means, coupled to said cache directory, for selecting a cache block for replacement as a function of reference count value and block age.

10. Apparatus as set forth in claim 9 further comprising:
(a) means, coupled to said directory, for initializing the reference count associated with a given block whenever the given block is used to store data from outside the cache on a cache miss; and
means, coupled to said directory, for stacking block reference counts, with the block count associated with the most recently used block being placed at the top of the stack.

11. Apparatus as set forth in claim 10 further comprising means, coupled to said directory, for selecting, on a cache miss, the block to be replaced from the set of blocks whose reference counts are below a preselected reference count threshold value thereby allowing for the possibility of non least recently used block replacement choices.

12. Apparatus as set forth in claim 11 further comprising:
(a) means, coupled to said directory, for maintaining multiple separate chains of blocks whose reference counts are below said preselected reference count threshold value and are of equal value in each chain; and
(b) for scanning each of said chains of blocks to identify and replace a block that has aged beyond said preselected age boundary threshold.

* * * * *